US007305407B2

(12) United States Patent
Genser

(10) Patent No.: US 7,305,407 B2
(45) Date of Patent: *Dec. 4, 2007

(54) SYSTEM AND METHOD FOR ORGANIZING SEARCH CRITERIA MATCH RESULTS

(76) Inventor: Mathias Genser, 1817 Yosemite Rd., Berkeley, CA (US) 94707

( * ) Notice: Subject to any disclaimer, the term of this patent is extended or adjusted under 35 U.S.C. 154(b) by 350 days.

This patent is subject to a terminal disclaimer.

(21) Appl. No.: 10/444,686

(22) Filed: May 23, 2003

(65) Prior Publication Data

US 2004/0034629 A1 Feb. 19, 2004

Related U.S. Application Data

(63) Continuation of application No. 09/747,334, filed on Dec. 22, 2000, now Pat. No. 6,594,670.

(51) Int. Cl.
*G06F 7/00* (2006.01)
*G06F 17/00* (2006.01)

(52) U.S. Cl. .................................. 707/102; 707/104.1

(58) Field of Classification Search ..................... None
See application file for complete search history.

(56) References Cited

U.S. PATENT DOCUMENTS

| 5,526,517 | A  | * | 6/1996  | Jones et al. | 707/8   |
|-----------|----|---|---------|--------------|---------|
| 6,208,985 | B1 | * | 3/2001  | Krehel       | 707/3   |
| 6,326,962 | B1 | * | 12/2001 | Szabo        | 715/762 |
| 6,594,670 | B1 | * | 7/2003  | Genser       | 707/102 |

FOREIGN PATENT DOCUMENTS

WO    WO 00/39708 A1    7/2000

* cited by examiner

*Primary Examiner*—Susan Y. Chen
(74) *Attorney, Agent, or Firm*—Fulwider Patton LLP

(57) ABSTRACT

In a system and method for organizing database search criteria match results which are generated through a search engine adapted to generate system databases upon the processing of search criteria established and submitted by a system user, the system is adapted to define and group the search criteria match results for presentation to the user based upon the relative emphasis or de-emphasis of such results. The system includes a context software module, for enabling the generating of a context database consisting of content, links, and layouts organized for presentation to the user, which module is adapted to determine and specify the context database based on a current context and settings. The system also includes a criteria software module for enabling the generating of a comparison database, adapted to enable criteria to be submitted, modified, and input by the user to generate comparison database information. It also includes a resolution software module for enabling the establishing of a relationship between a context database and a comparison database without modifying the context organized for presentation to the user. It further may include an argument software module for enabling an argument consisting of an expression constructed for a specific purpose to be formed and submitted. The system may also include a display axis software module for generating axes consisting of distinct search submissions to enable the display of search criteria matches.

11 Claims, 8 Drawing Sheets

FIG. 7

COGsearch.com — 32

About | Help — 44

Context: [General Index ▼] — 36, 38

General

General

This is the path to the current location shown below.

Status information regarding current operation and status appears here -- done. — 40

Search Criteria Entry Field [ ▼ ] [Search] [Refine] — Advanced

| Refine Control | | |
|---|---|---|
| buy | Algorithms | Graphics | Optical Storage |
| popularity | Artificial Intelligence | Hacking | Organizations |
| play | Artificial Life | Hardware | Parallel Computing |
| learn | Bulletin Board Systems | History | Performance and Capacity |
| invest | CAD | Home Automation | Product Support |
| work | Companies | Human Factors | Programming |
| | Computer Science | Internet | Publications |
| | Consultants | Intranet | Robotics |
| | Data Communications | Jobs | Security |
| | Data Formats | Learning | Shopping |
| | Desktop Publishing | Mailing Lists | Software |
| | DSP | MIS | Speech Technology |
| | E-Books | Mobile Computing | Supercomputing |
| | Emulators | Multimedia | Systems |
| | Ethics | Newsgroups | Used Hardware |
| | Fonts | Open Source | Usenet |
| | Games | Operating Systems | Virtual Realinty |

34

Search With: [Google ▼]   Goto   Settings search string 1
search string 2
search string 3
search string 4

Result link 1
Result link 2
Result link 3
Result link 4
Result link 5
Result link 6

42

SYSTEM AND METHOD FOR ORGANIZING SEARCH CRITERIA MATCH RESULTS

CROSS-REFERENCE TO RELATED APPLICATION

This application is a continuation of application Ser. No. 09/747,334 filed on Dec. 22, 2000 now U.S. Pat. No. 6,594,670.

COMPUTER PROGRAM LISTING APPENDIX

A Compact Disc-Recordable (CD-R) which includes a computer program listing is submitted with this application, since the computer program listing has over 300 lines of code. The material on the CD-R is incorporated by reference herein.

BACKGROUND OF THE INVENTION

1. Field of the Invention

This invention relates generally to improvements in systems and methods for organizing search criteria matches, and, more particularly, to a new and improved system and method for defining and grouping search criteria matches on the basis of the relative emphasis or de-emphasis of such matches, for presentation to the user, wherein the search criteria matches are generated by processing search criteria established and submitted by a user through a search engine adapted to generate databases for the system.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

A CD-R is included as the official copy of the computer program listing of the preferred form of source code consisting of over 300 lines of code, and is filed with and a part of this application and incorporated by reference herein.

2. Description of the Related Art

It has been known to provide an interactive environment for viewing, browsing, searching, finding, accessing, and obtaining content and/or information, through client-server networks including computers and the Internet. Such systems present information to a user where the user has varying degrees of interest in the information, which may or may not change based on context and/or time.

However, while desired information exists, it is hard to isolate, due to an ever expanding realm of human knowledge. For any given context, desired information may be lost in a huge body of irrelevant information. Searching this vast collection of knowledge is a significant problem.

Further, it has been known to provide currently available search mechanisms which enable the user to conduct searches. These technologies vary in capability ranging from being of little use to being highly effective.

For many users, however, these method and technologies do not provide satisfactory results. Their operation is cryptic and/or cumbersome, and therefore not easily implemented by many people.

On the one hand, fundamental user control over the search process is currently relatively simple but not very effective, in that the user may conduct a simple search but still be unable to find the desired information which may be lost in the unwanted information located, or may not be found at all. On the other hand, advanced control is successfully used by a very few, since its interface requires terse and cryptic syntax, unforgiving methodologies, and obscure nomenclature, as in boolean operators for example.

One of the most significant problems with this searching process is that although the user knows what he wants to find, expressing this desire to a search mechanism requires an unnatural exact syntax and terminology to generate desirable results. Search mechanisms presently do precisely what the user says, rather than what the user means. If search mechanisms were capable of interpreting the user input, including all contextual factors regarding the user and the query, they might be able to do what the user means, yielding much more satisfactory results.

Another aspect of user frustration regarding any search activity concerns not knowing what the system is doing. Pressing a button can still leave the user wondering whether the system understood the request. This type of frustration has a significant impact on the overall effectiveness of any system including a search system.

Indices are presently used by many search services. These attempt to organize information in a way that allows users to find what they are looking for with greater ease.

Search engines are also employed by many services. These allow the user to specify a search "parameter". The search engine then interprets this parameter and presents the user with its results. These results are presented in an ordered list and, in some cases, are categorized in some fashion. Many times, however, the system will do what the user said, rather than to present what the user really wants. The system will show a large superset of possibilities, overwhelming the user with information overload. In such cases, the user must examine a list of results in order to find what is being looked for.

Search technologies are making advances presently in interpreting user input and seeking to derive true user intent. One approach involves the formation of question databases allowing the user to specify a question and obtain possible answers. Some technologies attempt to interpret queries using a variety of schemes to process user input. The presentation of output, however, is still restricted to lists. In addition, the scope of this technology is limited to the subjects contained within their respective databases.

Therefore, those concerned with the development and use of improved search criteria matches organizing systems and methods and the like have recognized the need for improved systems and methods for interpreting user input, deriving and applying user intent, and presenting output in an efficient and effective manner.

Accordingly, the present invention fulfills these needs by providing efficient and effective systems and methods for providing a responsive interactive environment that does not make assumptions regarding what the user desires. Rather, they leverage off of the familiar, and provide the user with an effective means for indicating what they really want through an intuitive refinement of the search query submission. The system enhances any information generated in a search by identifying, ranking, and/or sorting such information for the user. It controls the presentation of any collection of content and data based on results passed to it from its current sources in addition to user direction. The sources can be anything capable of providing data, including but not limited to search engines. Combining these techniques and applying them efficiently creates an effective method for finding information.

SUMMARY OF THE INVENTION

Briefly, and in general terms, the present invention provides a new and improved system and method for interactively applying a set of display rules that emphasizes and de-emphasizes in varying degrees any collection of content and information links, without disturbing the content, organization, functionality, or layout thereof. It enables the user to find, sort, access, and view a collection of content and information in an effective manner through the use of intuitive interactive control, display cues and enhancement, and persistent search methodologies.

By way of example, and not by way of limitation, the present invention provides a new and improved system for organizing search criteria match results, generated by processing search criteria established and submitted by a user through a search engine adapted to generate system databases, in an effective and efficient manner. It includes presentation cues to show relevancy, which are particularly effective when used with familiar content and layout presentation. It enables the layout to remain the same both before and after all queries, showing the results without disturbing the layout of the content. For a Web page search, the layout and functionality of the page displays unranked links in one way, and ranked links in a different way through style, color, and/or symbolic modification. The presentation may reflect the ranking of the link, while the location and functionality of all items on the page remains as before the results were applied.

The system and method are adapted to operate generally, for example, within a display environment wherein there are choices such as links presented to the user, and in particular within the framework of World Wide Web browsers and browser-like environments. They are further adapted to take ranking data associated with the choices or links presented to the user, and, while preserving the existing organization and graphical layout of the information, to display the choices or links in such a manner that the ranking of the choices is clearly conveyed to the user. The ranking data may come from any source, such as the output of a search engine. For example, such a search engine may generate a prioritized list by using a score assigned to the list of items, wherein the list includes ranked choice or link items. The system may modify selected display characteristics of the choice or link items, leaving all other characteristics of the display unchanged. The characteristics modified may include, for example, choice or link size, style, hue, luminescence, intensity, and animation. Such modifications may be applied to the choice or link background.

The system can accommodate and clearly communicate to the user the relevancy of each presented item with respect to any number of user-defined or predefined categories, through emphasis, de-emphasis, and designation. The system further enables effective and intuitive construction, modification, and application of boolean search arguments. It also includes controls that notify the user of its task progress to minimize frustration and enable the user to focus on the task at hand. The user is able to utilize a persistent search technique, which applies parameters constantly modifying the display of whatever the user chooses to view as the user views it.

More particularly, the present invention constitutes a system for organizing database matches generated by processing search criteria established and submitted by a user through a search engine adapted to generate databases for the system. The system is adapted to define and group search criteria match results on the basis of the relative emphasis or de-emphasis thereof for presentation to the user.

The system, in accordance with the invention, includes a context software module, for enabling the generating of a context database consisting of content, links, and layouts organized for presentation to the user, adapted to determine and specify the context database based on a current context and settings. The system further includes a criteria software module for enabling a comparison database to be generated, adapted to enable criteria to be submitted and modified, and to enable the user to input criteria for generating comparison database information.

The system also includes a results resolution software module for enabling a relationship to be established between a context database and a comparison database, without modifying the context as organized for presentation to the user. The system may further include an argument software module for enabling an argument consisting of an expression constructed for a specific purpose to be formed and submitted.

The system of the present invention may also include a display axis software module for generating axes for the display of search criteria matches responsive to the interaction of the results resolution software module with the display axes. A search axis comprises a distinct search submission. The system may still further include a control state software module for enabling the user to manipulate the system.

These and other elements, objects, and advantages of the invention will become apparent from the following more detailed description, when taken in conjunction with the accompanying drawings of illustrative embodiments.

BRIEF DESCRIPTION OF THE DRAWINGS

FIG. 7 is a similar diagram of a user interface after a refine operation, in the practice of the invention;

DETAILED DESCRIPTION OF THE PREFERRED EMBODIMENTS

Figure 1:
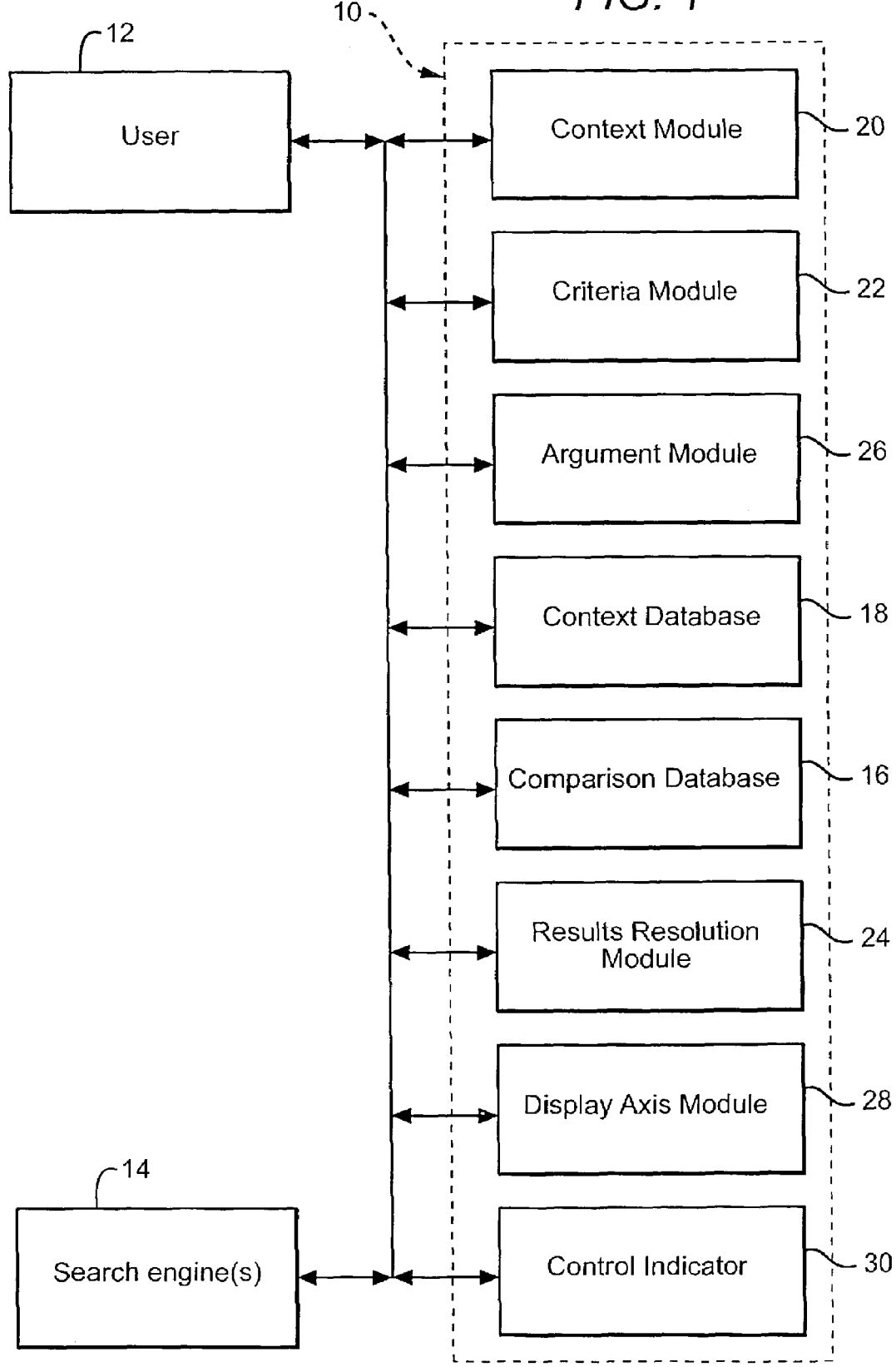
FIG. 1 is a block diagram of a system and method for organizing search criteria matches, in accordance with the present invention.

The present invention is directed to an improved system and method for organizing search criteria matches in an efficient and effective manner, wherein the matches are generated by processing search criteria established and submitted by a user through a search engine adapted to generate databases for the system. The improved system and method provides effective and efficient defining and grouping of search criteria matches on the basis of the relative emphasis or de-emphasis thereof for presentation to the user. The improved system and method are further adapted to define and group search criteria match results so as to present the content, layout, and functionality of links to search criteria match result hits and links to search criteria match result non-hits, while conveying the distinctions therebetween. The preferred embodiments of the improved system and method are illustrated and described herein by way of example only and not by way of limitation.

The system and method herein are adapted to provide interactive display control of information while preserving the original layout and organization of the information, and while adding cues that categorize and distinguish information in a readily grasped manner. They utilize different methods of emphasis, de-emphasis, and designation to accommodate and clearly communicate to the user the relevancy of each presented item with respect to any number of user defined or pre-defined categories. For example, relevancy with regard to a particular parameter may be tied to a color display of the link text, while the relevancy with regard to a second parameter may be conveyed through the representation of the background of the text. Through the use of a variety of devices such as, but not limited to, symbologies or icons, the relevance of each item with regard to each of a plurality of parameters may be clearly conveyed to the user.

Parameters may be treated as equivalent, as for example by being mapped to a common display method, or treated as separate, as for example by mapping and displaying each term with different methods. Relevancy with regard to a single parameter may be conveyed through the use of variable display characteristics of a symbology, while degree of relevancy may be reflected in user discernable variation in mapping symbology. A term that maps to more than one parameter may display multiple parameters, enabling the user to easily determine the relationship between the displayed content and layout with regard to specified parameters, and by adjusting these relationships to interactively refine an information culling process.

The system and method herein are further adapted to provide simple and intuitive construction, modification, and application of boolean search arguments. The display of such operations may take many forms, as for example for items that contain two distinct terms, the equivalent of a boolean AND operation may be displayed with more emphasis than any item matching only one term. A NOT operation may enable the affected item to be de-emphasized.

Such system and method herein may also include controls that notify the user of the progress of tasks to minimize frustration, enabling the user to focus on the task at hand, particularly with tasks that take significant time, such as tasks in World Wide Web applications that are executed at the server side, as well as other lengthy operations.

The system and method may be applied to any viewable context at any time, as it does not disturb content, organization, or functionality. This enables the user to use a persistent search technique, applying parameters constantly modifying the display of whatever the user chooses to view as the user views it. Calling up a set of information in the display applies the parameters and results to that instance of content and its organization. The same parameters may be applied to any context, either by calling up a different context or enabling the parameters while viewing any context.

In the method of operation of the system, the techniques are applied in a manner that adds the powerful capabilities therein without disturbing content familiarity. The implementation utilizes suitable techniques available to yield responsive performance. Many interactions appear to be instantaneous, while others keep the user informed or are implemented in such a way that the impact thereof is minimized and de-emphasized. Cues are tailored to any given application to best emphasize and de-emphasize subject matter. Emphasis and de-emphasis may be expressed through manipulation of attributes such as for example size, color, style, highlight, and background presentation. Symbologies may also be integrated into the display.

Referring now to the drawings, wherein like reference numerals denote like or corresponding parts throughout the drawing figures, and particularly to FIGS. 1-9, and in particular to FIG. 1, the system 10 is adapted to organize database matches generated by processing search criteria established and submitted by a user 12 through a search engine 14 adapted to generate databases for the system 10. Search criteria comprise user-specified parameters adapted to form comparison databases 16. A comparison database 16 comprises search criteria hits, adapted to be used in conjunction with a context database 18 to determine search criteria matches. The comparison database 16 further comprises the current comparison database, and links adapted to access context. A hit comprises a single positive result returned from a search submission.

A context database 18 comprises a database adapted to be associated with a context, which comprises content, links, and layouts organized for presentation to the user 12. A context database 18 further comprises a collection of links which reference contexts and information. The context database 18 also comprises the current context database, links to World Wide Web pages, and links adapted to be accessible within the current context. The context database 18 further comprises links associated with accessible links. The associated links comprise a plurality of links appearing within a sub-context accessed through a link located within the current context, wherein a sub-context comprises a context accessed through a link which exists within another context.

Figure 2:
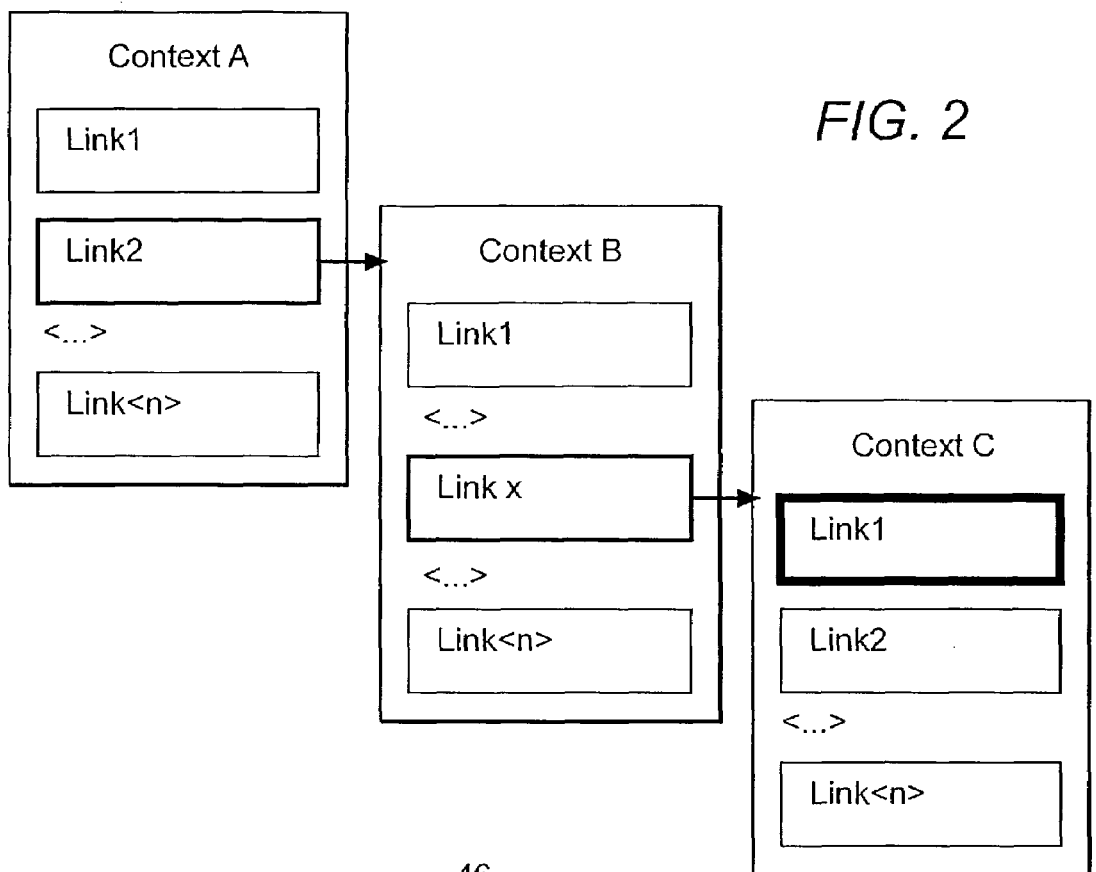
FIG. 2 is a flow chart of the path of a sequence of links leading from context to context, in the practice of the invention.

A link comprises an interactive control adapted to enable a user to change the current context to the context associated with the link. The links comprise Uniform Resource Locators (URLs), wherein each URL comprises an absolute address of a context in the World Wide Web. Each link is adapted to access subordinated contexts, links, and content. Each link is adapted to access subordinate links through a link path comprising a sequence of links leading from context to context in a continuous path, as shown in FIG. 2. The link path is adapted to enable the user to change contexts by activating a first link in the path, and by activating another link located within the context which changes the context within which a further link in the path is located. Search criteria matches comprise search criteria match links.

The system 10 includes a context software module 20 for enabling a context database 18 to be generated, adapted to determine and specify the context database 18 based on a current context and settings. The context software module 20 is adapted to generate the context database 18 based on static values, or based on process submissions. The system 10 further includes a criteria software module 22, for enabling a comparison database 16 to be generated, adapted to enable criteria to be submitted and modified, and to enable the user 12 to input criteria for generating comparison database information. The criteria software module 22 includes a criteria modification software module for enabling the user to modify the input criteria term and the processing thereof. The criteria modification software module 22 is adapted to attribute designation of a criteria term, to change the criteria term, and to flag the criteria term for exclusion of the criteria term from consideration. The criteria modification software module 22 is also adapted to adjust a boolean operator flag of the criteria term, to adjust a display axis flag of the criteria term, and to adjust placement of the criteria term in a submission order.

The system 10 further comprises a results resolution software module 24, for enabling a relationship to be established between the context database 18 and the comparison database 16, without modifying the context as organized for presentation to the user 12, and for evaluating the context database 18 against each comparison database 16. The results resolution software module 24 is adapted to compare each context database link to each comparison database link. The system 10 further comprises an interacting module for enabling the context software module 20, the criteria software module 22, and the results resolution software module 24 to interact with each other. The interacting module comprises a database for interconnecting and transmitting information among the context software module 20, the criteria software module 22, and the results resolution software module 24. The interactive module database includes data bus structures internal in or external to a computer. The external data bus structures comprise the Internet.

The system 10 may also include an argument software module 26 for enabling the forming and submission of an argument, which comprises an expression constructed for a specific purpose. The construction of an argument is adapted to be specific to a specific submission destination. The system 10 is also adapted to enable the context to be changed, whereupon the arguments are applied within the changed context. The argument software module 26 is further adapted to determine whether the context database 18 needs to be updated, and also to notify the results resolution software module 24 upon updating of the context database 18 and the comparison database 16. The argument software module 26 is adapted to accept a current criteria queue, an associated setting, and a current context setting, and to determine the need for updating the context database 18 responsive to the settings and the status of an existing context database 18 and a comparison database 16. A criteria queue includes criteria used to form arguments. The criteria queue is adapted to enable the user to modify the criteria. Changing the context is adapted to modify the current context settings so as to affect argument submissions. The system 10 further may include preloaded arguments, wherein modifying the current context settings may include modifying preloaded arguments.

The argument software module 26 is further adapted to update and submit all arguments as required if the context changes, and to refer to the associated settings, parse the criteria into arguments, and pass the argument to an external service and submit the arguments, so as to create and update a corresponding comparison database 16. The results resolution software module 24 is adapted to evaluate the context database 18 against each comparison database 16 based upon flags for criteria or arguments, upon notification by the argument software module 26. The flags include designations regarding boolean operators and display axes, and the flags include designations regarding exclusions.

The system 10 may further include a display axis software module 28 for generating axes for the display of search criteria matches, responsive to the interaction of the results resolution software module 24 with the display axes. The display axis software module 28 is adapted to define the relative emphasis or de-emphasis of search criteria matches, for conveying matches to the user 12, and for grouping thereof, for presentation to the user 12. The display axis software module 28 is further adapted to consider each display axis and its designated presentation parameters, updating the display, and generating settings based thereon. It is also adapted to convey respective matches so as distinguish results derived through one comparison database 16 from results derived through another comparison database 16. The search axes comprise distinct search submissions. A search axis includes a comparison database 16 associated therewith. Each display axis is adapted to display the relationship between the source criteria in the criteria queue and the results generated by the criteria, and to communicate variations in intensity for conveying the intensity of a search criteria match. The display axes are adapted to be combined in a plurality of ways. The display axis software module 28 is adapted to assign a display property based upon the settings. A comparison database 16 and a related argument each include corresponding axes, and the corresponding axes are adapted to maintain the relationship between the comparison database 16 and the argument.

The results resolution software module 24 is adapted to display substantially immediately the context link display properties adjustments, and to accumulate the context link display properties adjustments for subsequent display. The results resolution software module 24 is further adapted to adjust each display axis to emphasize increment, and to adjust each display axis to de-emphasize increment and emphasize decrement. The results resolution software module 24 is also adapted to adjust each display axis to emphasize maximum, and to adjust each display axis to de-emphasize maximum and emphasize minimum.

Further, the system 10 may include a control state software module 30 for enabling the user to manipulate the system 10, and for providing feedback to the user 12 regarding the progress of the operation tied to the control. The control state software module 30 is adapted to indicate that control has been activated by the user, and that control has contacted the associated process. The control state software module 30 is further adapted to indicate the progress of a process, and to indicate that a process is complete. The control state software module 30 is also adapted to indicate that control is available to be activated, or that control is not available to be activated by the user. The control state software module 30 is adapted to enable the user to perform other actions without awaiting completion of a process, and to be used for controls accessible to the user.

Search criteria matches comprise search criteria match links. Emphasis of search criteria match links comprises the conveyance of the relevancy of links within the current context. De-emphasis of search criteria match links comprises the conveyance of the lack of relevancy of links within the current context. Match links comprise common links between the comparison database 16 and the context database 18. The context links include display properties, and the results resolution software module 24 is further adapted to adjust the context link display properties for each match of a comparison link to that of a context link. The system 10 further includes an element for connecting the system 10 to a search engine 14, comprising for example a data bus. The search engine connecting element is further adapted to connect to a search engine optimized for searching context and returning results in a specific format.

The system 10 may also include a user interface display in a browser window. The user interface display includes a title bar. The title bar includes an identifier component for identifying the system provider, a context selector component, and an about link component. The context selector component is adapted to enable the user to select the context for conducting subsequent operations, and comprises a mutually exclusive list. The about link component comprises a window which includes miscellaneous information. The title bar also includes a help link component, a current context path component, and a current sub-context component. The help link component comprises a window which includes help information. The current context path component is adapted to identify the current link path which leads from the top context level to the current sub-context. The clicking of a link in the link path changes the current context to the link clicked, and updates the current context to indicate the change. The current sub-context component is adapted to identify the current sub-context and task progress information.

The title bar also includes a search criteria entry field, a search button, a refine button, and an advanced link component. The search criteria entry field is adapted to enable the user to enter search criteria, and to accommodate text handling functionality. The search button is adapted to execute a search operation upon pressing thereof, to add the search operation item to a criteria queue if the queue is empty, to execute an update, and to replace the current criteria in a criteria queue if the queue contains a search operation item. The refine button is adapted to execute a refine operation upon pressing thereof, to add the current criteria to a criteria queue, and to execute an update operation. The advanced link component is adapted to enable the user to access advanced search settings and functionality.

The title bar further includes a refine criteria queue, a current context display, and a search engine title bar. The refine criteria queue includes preset and user specified criteria, and is adapted to enable the user to modify the criteria therein, and to enable the user to make changes and execute an update operation. The current context display includes the current context comprising links, content, and layout therefor. The search engine title bar is adapted to display a current search engine, and to enable the user to change the current search engine. The title bar further includes a goto link, a settings link, and a current search results display. The goto link is adapted to open a window for displaying a currently selected search engine window, and to pass a current argument to a current search engine. The settings link is adapted to open a window for enabling the user to control the behavior of a search engine, and to vary the settings depending upon a currently selected search engine. The current search results display includes a window for displaying the results of a current search engine.

In a method of operating the system, for example, as illustrated in FIGS. 3-7, the user may type in the search service address 32 in the URL field for access thereto. The search service window 34 may include an index 36, a Search Term Entry Field 38, and a Search Refine Control 40. An area 42 thereof may display search results, and may be blank initially. For a user action of entering a search term, the user may type a term into the search term entry field, and click on a find button. The field may then be cleared and the term placed in a Search Term History list. A result index may then be updated to display the result of the search. Certain items may then be highlighted, while others are lowlighted. Highlights may indicate that there are search term matches within the category, and lowlights may indicate the absence of search term matches within the category. A search result list area which may be below the result index may display for example the twenty top results with a more button for access to further top results. A result refine control may display the search term which the user has just performed a search with, which may appear below preset items therein.

The user in such a method may then type another term into the search term entry field and click on the find button. The result search term entry field may be cleared, and the term may be placed in the Search Term History List, and appear above the previous term. The result index may then be cleared of highlights and lowlights, and then updated to display the result of the current search term. Certain items my then be highlighted and others lowlighted, with highlights indicating that there are search term matches within the category, and lowlights indicating the absence of search term matches within the category. The search result list area may then be clear of the previous results from the previous searches, and the system may display the top twenty results with a more button. The result refine control window may then be cleared of the previous search term, and the current search term may be displayed therein.

For a user action of adding a search refine term, the user may type another term into the search term entry field. Instead of clicking on a find button, the user may click on the refine button 44. Clicking on a back button may undo the previous refine action. Continuing to click on the back button may undo all refine actions until there are none left. Clicking on a forward button may redo the previously undone refine actions. All actions may have an immediate effect on the display screen. The action of the result search term entry field may then be the same as when the user clicks on the find button, in that the field may be cleared and the term placed on the Search Term History List, appearing above the previous term. The results index may then be cleared of highlights and lowlights, and then updated to display the merging of the results of the previous search and the current search. Results index items may then appear highlighted if found within the index category containing a match for one of the search terms, and lowlighted if found within the index category containing a match for none of the search terms.

The highlight in such action may be variable for the results index, and also for the search result list, in that if the found item is within the index category containing a match for more than one of the search terms, its highlight display value may be increased. The gradations of highlight values may be based on the number of active search terms. This system and method enables the user to constrict certain boolean search arguments in a natural way, accommodating OR and AND arguments. The result from the previous search may then be cleared from the search results area. The system may then display the top twenty results of the search conducted with the previous search term and the current search term as the search engine arguments, and may provide the more button. The previous search term may remain in its place in the refine control window, with the current term appearing below the previous term.

Figure 4:
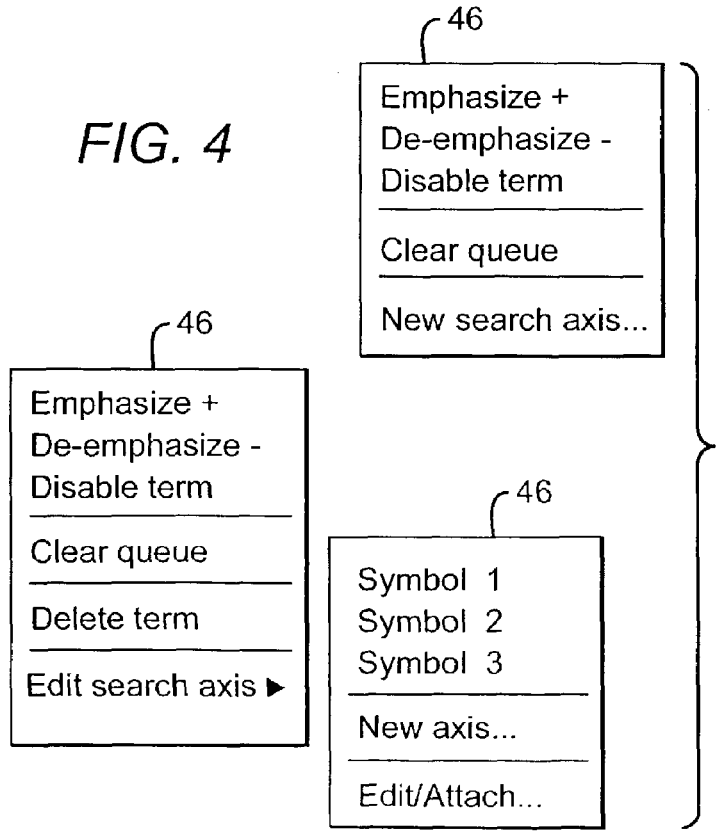
FIG. 4 is a diagram illustrating a series of menus for controlling the operation of the system and method, pursuant to the present invention.
Figure 3:
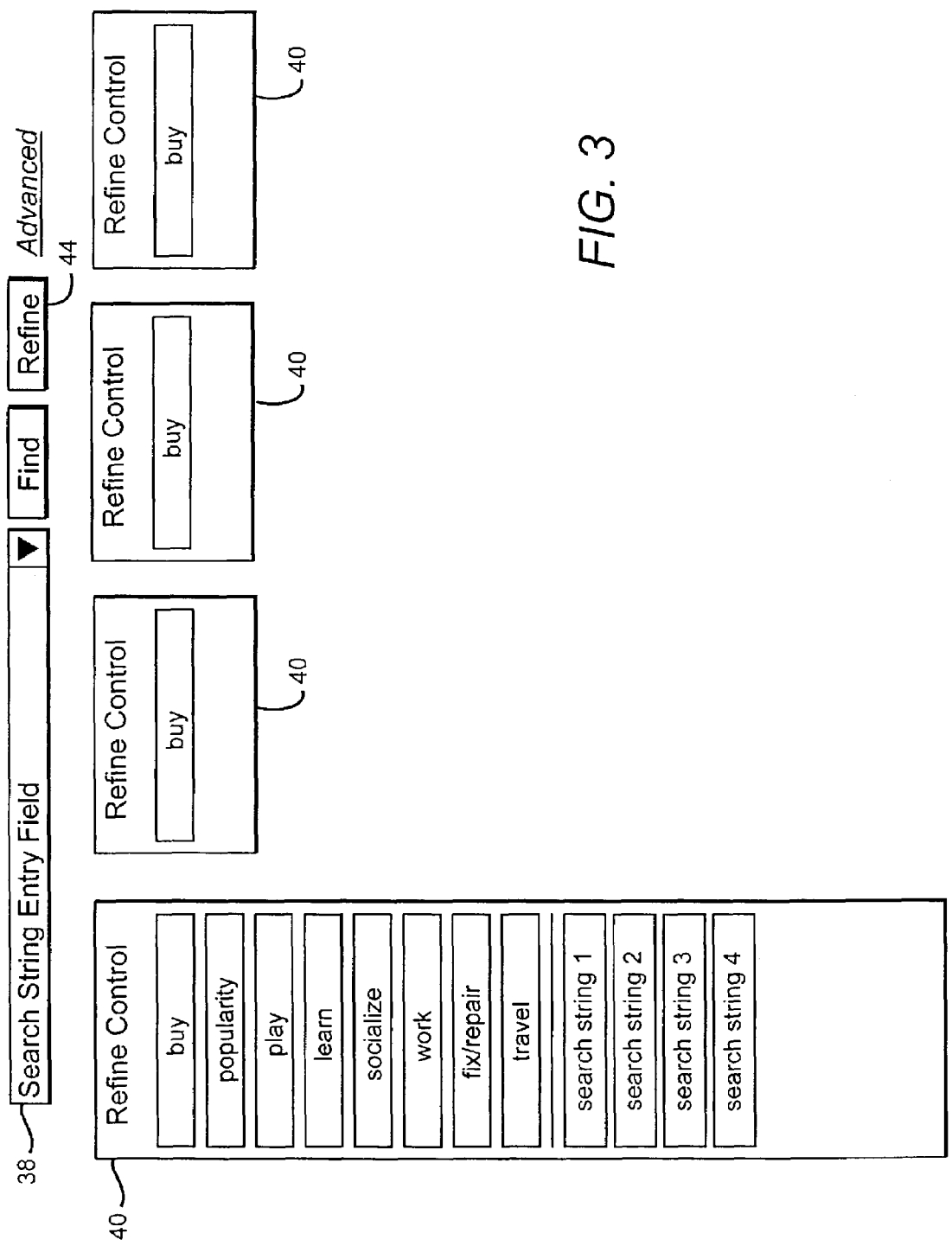
FIG. 3 is a diagram showing a sequence of refine control operations, in accordance with the invention.
Figure 5:
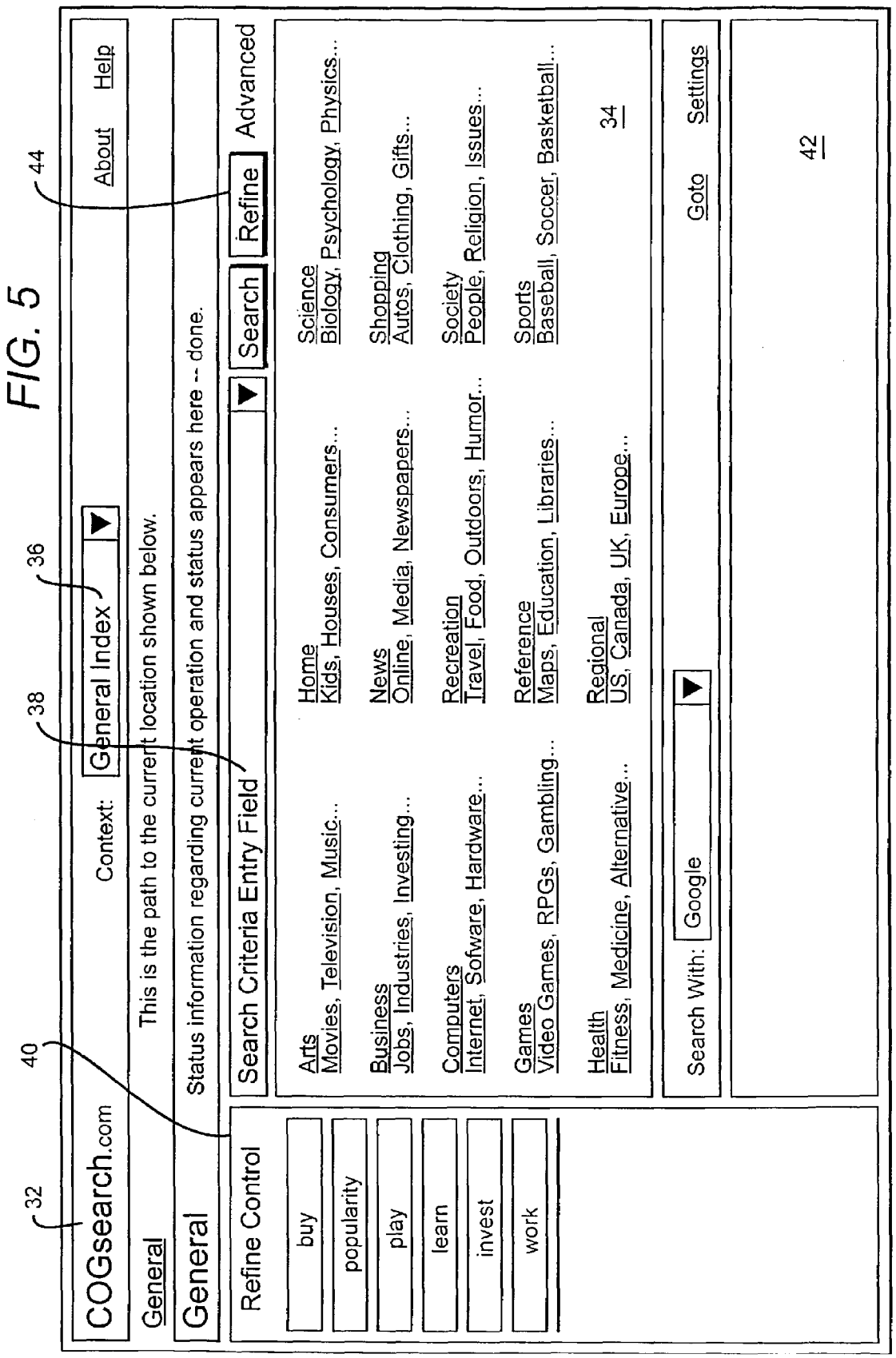
FIG. 5 is a diagram of a user interface in an initial state, in accordance with the present invention.
Figure 6:
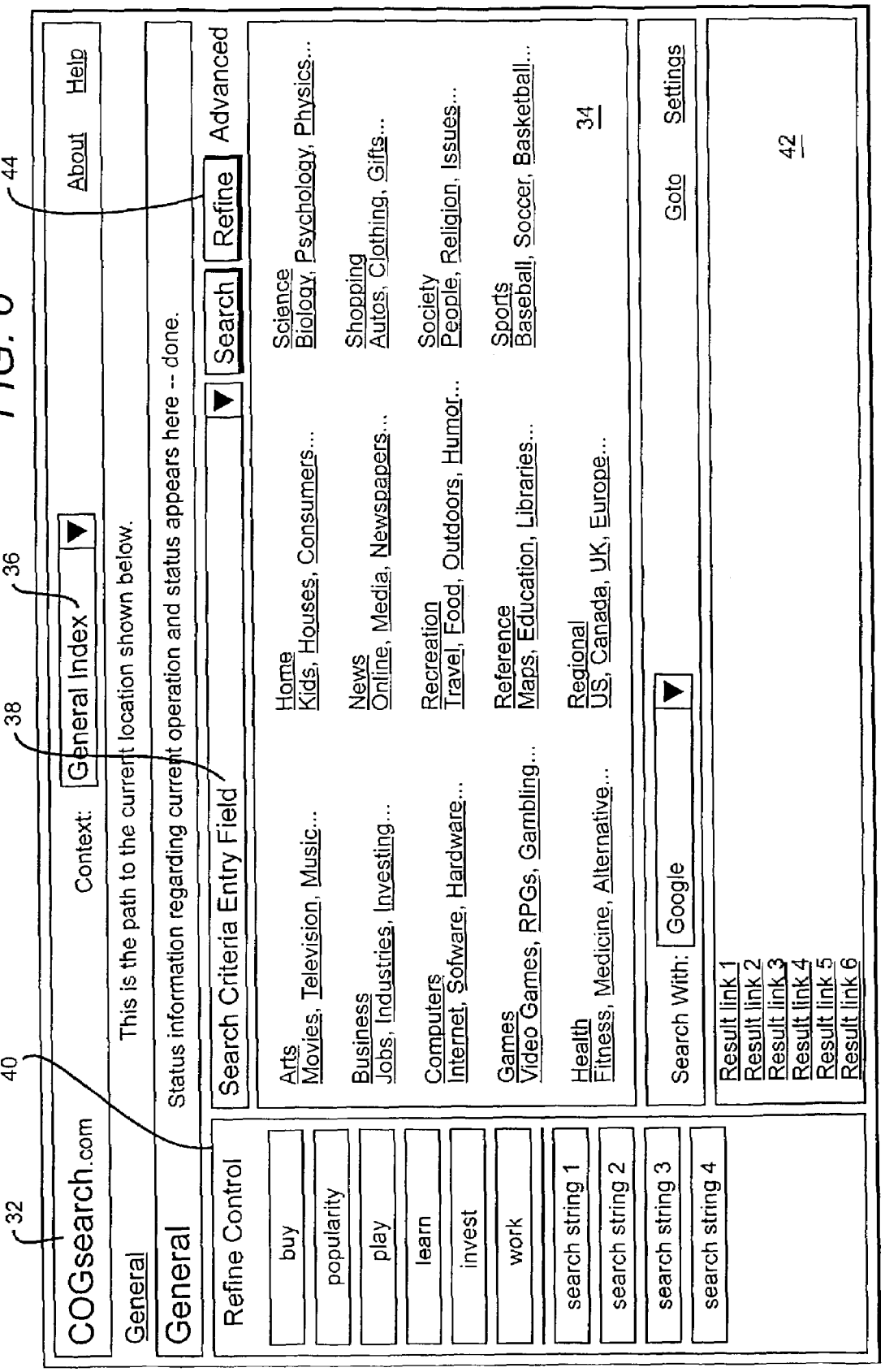
FIG. 6 is a similar diagram of the user interface after a search operation, pursuant to the present invention.

For a user action of refine control by modifying a search term, the user may modify the effect that any preset or search term has on the index and result list. Clicking on the term in the refine control window may cause the display effect to cycle through primary preset states. Clicking on the term may display a menu 46 that shows the current state of the term, and enables control over these states and access to other functionality, as seen in FIG. 4. For primary preset states, changing the preset state may have an immediate effect on the index and search result list display. The states of each preset and term may be indicated in the display of the preset and term of the refine control window. When in a disabled state, the term is not considered when resolving the index and/or list display. When in an emphasize state, the term is applied to the index and the search result list, with matches emphasized or highlighted. When in a de-emphasized or highlighted. When in a de-emphasize state, the term is applied to the index and the search result list, with matches de-emphasized or lowlighted in the index, and excluded in the search results list. The user may use de-emphasize to refine a search to exclude things, as to exclude e-commerce items by setting a buy preset to de-emphasize.

For a user action of clicking on an index item, the index window may be updated so that it displays the appropriate sub-index. All active refine control presets and terms may then be applied to the current index and displayed appropriately. The search list may then be regenerated, utilizing all of the active refine control presets and terms in addition to the appropriate sub-index context arguments. For a user action of clicking on a search result item or an index result item in a search result list, the user may then be taken to the appropriate item and page. For a user action of closing the search service and opening the search service again, closing the window may clear all queues. Returning to the search service also may return to cleared search entry fields, refined control queues, and refine control presets disabled. Search parameters and states may be saved as procedural bookmark.

Figure 8:
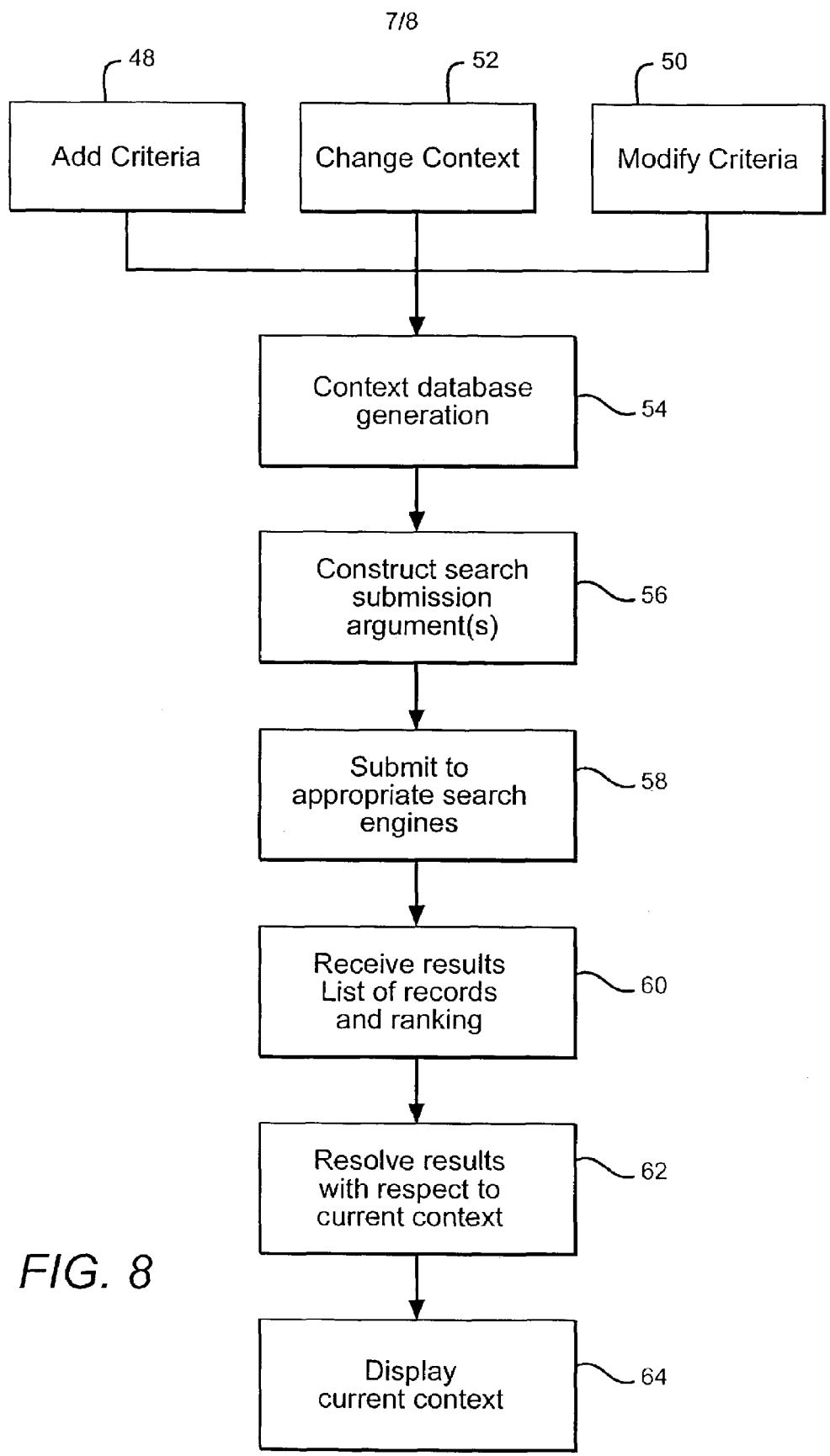
FIG. 8 is a flow chart of a sequence of operations, in accordance with the present invention.

In the operation of the system 10 of the invention, as seen in FIG. 8, the user may place a term in a search entry field, and may add criteria through the control state software module 30, at step 48, to append the entry to a criteria queue, and to set an operator to a system default. The user may modify the criteria through the control state software module 30, at step 50, and may modify the term to edit the characters in the term, and modify the properties of the term. Modifying properties may comprise modifying a database generation mapping, modifying a database determination mapping, modifying an axis, and modifying an operator state. The user may change a context through the control state software module 30, at step 52. A content or a layout displayed on a page may be changed, and a sub-context link may be clicked on for change. A context database 18 may be generated, at step 54, generating a context database 18 which may be pre-defined, and which may comprise links or URLs in a current context. Generating may further comprise generating the context database which includes further URL link addresses subordinate to the links which appear in a context page. Generating further comprises generating the context database wherein the subordinate links are linked directly or through other intermediate links to parent links which appear in the current context.

A submission argument may be constructed and submitted, at step 56. Constructing a submission argument may comprise constructing the submission argument for controlling the generating of a comparison database 16, and may comprise influencing a context in a submission argument. Constructing may further comprise constructing a single term submission argument, constructing a multiple term submission argument, or constructing a combination submission argument. Submitting may comprise passing arguments to other systems based on system settings, at step 58, and may further comprise the user modifying a submission parameter, and the resubmitting of results affected by the modified submission parameters. Constructing may further comprise constructing the submission argument which includes information for generating and defining the comparison database, constructing the submission argument for controlling the generating of a static comparison database, and constructing the submission argument for controlling the generating of a procedure for defining, generating, and looking up a comparison database. Influencing may comprise enabling a current context to affect the constructing of the submission argument, and combining additional modifiers with other components. Single term constructing may comprise entering a single term in a search entry field, and generating a criteria and applying system and user settings. Multiple term constructing may comprise entering multiple terms in a search entry field, and interpreting the multiple terms through associated process, system, and user settings. Combination constructing may comprise combining submission arguments into a single submission argument by applying system and user settings.

Passing may comprise passing arguments to systems residing locally on a client. Combining comprises determining the modifiers by analyzing the current context and other parameters and procedures. Entering comprises pressing a search button, and assigning a default boolean AND operator. Multiple term constructing comprises applying the associated settings to the criterion. Passing arguments comprises accessing the local client system through a data bus, and accessing the local client system through remote access means.

Results may be received and resolved, at step 60. Receiving results may include maintaining the relationship between the result and the submission, preserving a ranking returned with the results for subsequent application during displaying, and receiving each result which comprises a comparison database. Receiving results may further comprise composing the results, associating additional description with the result, and associating additional links with the result. Resolving the results may comprise resolving the relationship of each comparison database against a current context database, at step 62. Composing results comprises determining that results returning more than one hit include at least one associated link comprising a URL. Relationship resolving comprises comparing the context database 16 against each submission argument database. Determining results includes a URL appearing as a distinct address, and a URL appearing as part of an address path. Composing further comprises accumulating match counts for each link in the context. Composing further comprises attributing matching subordinate context links to corresponding parent links appearing in the current context.

A current context may be displayed, at step 64. Displaying may include updating the display of the current context based on system and user settings. Displaying includes displaying links in the current context. Displaying links includes de-emphasizing links in the current context that do not include a match with respect to submission results, and appropriately displaying links which include varying degrees of matching. Displaying further comprises specifying that different search axes are presented using symbologies and display technologies for indicating the de-emphasis and emphasis distinctions. Displaying links includes determining and applying display information as it occurs, and accumulating display information for consolidated determining and applying thereof.

Figure 9:
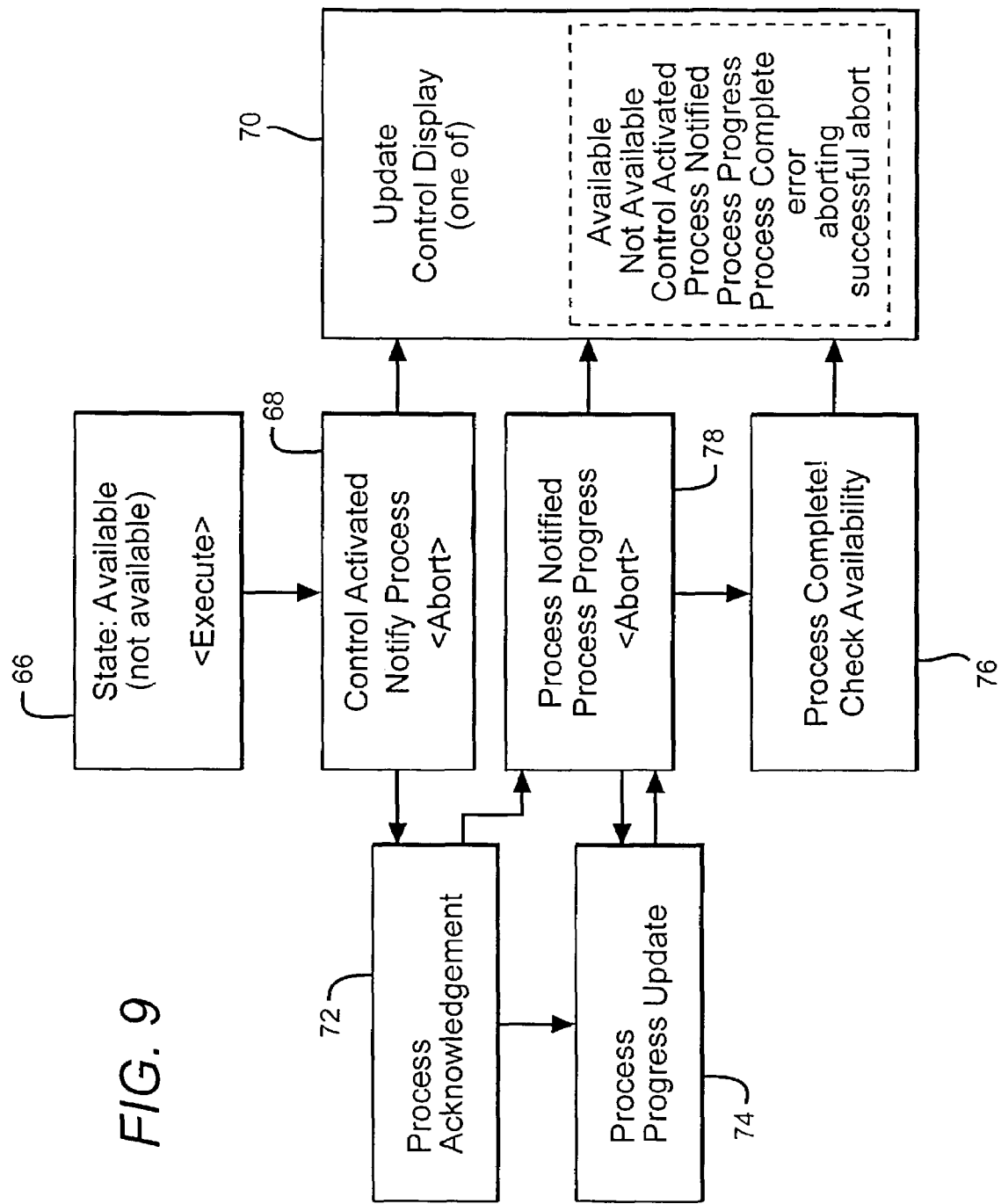
FIG. 9 is a flow chart of the operation of a control mechanism, in accordance with the invention.

The present invention further includes a method of controlling the client side and process side of a client-process operation, as illustrated in FIG. 9, for organizing database matches generated by processing search criteria established and submitted by a user through a search engine adapted to generate databases, in a system for defining and grouping search criteria match results on the basis of the relative emphasis or de-emphasis thereof for presentation to the user.

Controlling may comprise activating a control for controlling the client side and the process side. Activating may comprise locally executing through a locally executed module, or remotely executing through a remote process. Remotely executing comprises remotely executing through a server. Activating may comprise pressing a menu button, and accessing a menu which includes further control options. Pressing may include canceling a process upon pressing the menu button while the control indicates it is engaged in the process.

The control may indicate whether it is available for activation, at step 66. The user may activate the control and the control may indicate the state thereof, at step 68. Activating may comprise pressing the button. Activating may include the control providing feedback through a visual change and audio cue, and indicating that the button has been pressed and that the client is executing a specific procedure, through updating the control display, at step 70. Activating may further include the client attempting to contact an associated process. The control may remain in a state until receiving acknowledgment from the process. The process side may acknowledge the control activation.

The process side may return an acknowledgment to the client upon the contacting of the process side, at step 72. The user may be notified through a visual cue, an audio cue, a visual change, or an audio change. The client may await the associated task program update and completion, at step 74. The system may complete a requested task and notify the client, at step 76. Completing may include completing client side and process side procedures. The user may be notified of task completion through a visual cue, or through an audio cue. The system may indicate completion to the client side. The control may revert to an appropriate state. The control may be accessible or inaccessible dependent upon the state of the application. The control may indicate an error condition. The control may indicate that its associated process is aborting, upon the user having the option and choosing to abort, at step 78.

The present invention provides improved systems and methods for utilization in many different applications. They are adapted to operate on existing content and layout, and they take advantage of pre-existing user familiarity of organization and structure of a collection of information. They may be applied for example to any web page, and may also be applied to the display of various informational structures, such as for example finding information contained within computerized file and directory structures, transportation schedules, or entertainment event calendars and schedules.

The systems and methods herein may be adapted to enable the user to access all information that appears in the screen display, as for example by moving the control out of a browser window and making it independent of the screen display. The control may be separated completely from the display, as by being controlled from a different source. For example, as the user accesses content, the system may be notified by the site that it should apply a set of parameters to the presentation of the information, where the user has not explicitly requested such action, and the parameters and process may be applied to affect the current display of content.

The systems and methods herein may be used on any web page, adding functionality, as by showing the relevancy of the links on a page based on a current set of evaluation criteria, without affecting the functionality of the page. They may be applied to any data and data access structure or mechanism resembling such structures, including other applications not strictly considered web-browser applications, such as for example computer system directory listings and schedules.

It will be apparent from the foregoing that, while particular forms of the invention have been illustrated and described, various modifications can be made without departing from the spirit and scope of the invention. Accordingly, it is not intended that the invention be limited, except as by the appended claims.

Examples of a preferred form of source code, for use in carrying out the above described software and firmware steps in conjunction with the hardware as described above, are included in the CD-R as the official copy thereof which is a part of this application and incorporated by reference herein.

What is claimed is:

1. A method of organizing database matches generated by processing search criteria established and submitted by a user through a search engine adapted to generate databases, in a system for defining and grouping search criteria match results on the basis of the relative emphasis or de-emphasis thereof for presentation to the user, comprising:
    the user placing a term in a search entry field;
    the user adding new search criteria through a control state software module, wherein, said control state software module appends the user entered entries to a criteria queue, and sets an operator as the system default; and
    the system modifying the display of the grouped search criteria match results on the basis of the relative emphasis or de-emphasis thereof.

2. The method of claim 1, further comprising the user modifying the criteria through the control state software module.

3. The method of claim 1, further comprising the user changing a context through the control state software module.

4. The method of claim 1, further comprising generating a context database.

5. The method of claim 1, further comprising constructing a submission argument.

6. The method of claim 1, further comprising submitting arguments.

7. The method of claim 1, further comprising receiving results.

8. The method of claim 1, further comprising resolving results.

9. The method of claim 1, further comprising displaying a current context.

10. The method of claim 2, wherein modifying comprises the user modifying the term, to edit the characters in the term.

11. The method of claim 2, wherein modifying comprises the user modifying the properties of the term.

* * * * *

UNITED STATES PATENT AND TRADEMARK OFFICE
CERTIFICATE OF CORRECTION

| | | |
|---|---|---|
| PATENT NO. | : 7,305,407 B2 | Page 1 of 1 |
| APPLICATION NO. | : 10/444686 | |
| DATED | : December 4, 2007 | |
| INVENTOR(S) | : Mathias Genser | |

It is certified that error appears in the above-identified patent and that said Letters Patent is hereby corrected as shown below:

Column 14, line 19, insert after herein. --The portions of the application contained on a compact disk are identified as follows: The machine format and operating system compatibility for the identity of the compact disk are as follows: IBM PC, MS-Windows. The name, size and creation dates of the files contained on the compact disk are as follows: BufferedRandomAccessFile, 29.3KB, December 20, 2000, JAVA File; Cogsearch, 27.3 KB, December 20, 2000, JAVA File; Filelist, 309 bytes, December 20, 2000, JAVA File; Ftsearch, 5.79 KB, December 20, 2000, JAVA File; Lookup, Size 1.68 KB, December 20, 2000, JAVA File; mmap, 8.46 KB, December 20, 2000, JAVA File; Pars_rdf, 2.90 KB, December 20, 2000, JAVA File; part00, 3.64 KB, December 20, 2000, HTML Document; part 01, 1.95 KB, December 20, 2000, HTML Document; part04, 904 bytes, December 20, 2000, HTML Document; path, 12.8 KB, December 20, 2000, JAVA File; readme, 340 bytes, December 20, 2000, Text Document; trie, 14.6 KB, December 20, 2000, JAVA File; wordinfo, 993 bytes, December 20, 2000, JAVA File.

Signed and Sealed this

Twenty-second Day of July, 2008

JON W. DUDAS
*Director of the United States Patent and Trademark Office*